United States Patent
Stau et al.

(10) Patent No.: US 12,162,414 B2
(45) Date of Patent: Dec. 10, 2024

(54) CABLE GUIDE AND MOTOR VEHICLE

(71) Applicants: VOLKSWAGEN AG, Wolfsburg (DE); NEWFREY LLC, New Britain, CT (US)

(72) Inventors: Bastian Stau, Gießen (DE); Peter Will, Gießen (DE); Henrik Burgsmüller, Gießen (DE)

(73) Assignees: NEWFREY LLC, New Britain, CT (US); VOLKSWAGEN AG, Wolfsburg (DE)

( * ) Notice: Subject to any disclaimer, the term of this patent is extended or adjusted under 35 U.S.C. 154(b) by 303 days.

(21) Appl. No.: 17/799,949

(22) PCT Filed: Feb. 15, 2021

(86) PCT No.: PCT/EP2021/053653
§ 371 (c)(1),
(2) Date: Aug. 16, 2022

(87) PCT Pub. No.: WO2021/160884
PCT Pub. Date: Aug. 19, 2021

(65) Prior Publication Data
US 2023/0192013 A1    Jun. 22, 2023

(30) Foreign Application Priority Data
Feb. 16, 2020 (DE) .................... 10 2020 104 018.0

(51) Int. Cl.
*B60R 16/02*    (2006.01)
*B60J 5/06*    (2006.01)
*B60R 16/027*    (2006.01)
*H02G 11/00*    (2006.01)

(52) U.S. Cl.
CPC ............ *B60R 16/0215* (2013.01); *B60J 5/06* (2013.01); *B60R 16/027* (2013.01); *H02G 11/006* (2013.01)

(58) Field of Classification Search
CPC ... B60R 16/0215; B60R 16/027; H02G 11/00; H02G 11/006; H02G 3/0475
See application file for complete search history.

(56) References Cited

U.S. PATENT DOCUMENTS

2007/0111551 A1    5/2007    Nishijima et al.
2007/0119610 A1    5/2007    Kisu et al.
(Continued)

FOREIGN PATENT DOCUMENTS

DE    102005055848 A1    5/2007
DE    102006045647 A1    6/2007
(Continued)

OTHER PUBLICATIONS

International Search Report dated Jun. 15, 2021 filed in PCT/EP2021/053653.

*Primary Examiner* — Paresh Paghadal
(74) *Attorney, Agent, or Firm* — Nyemaster Goode, P.C.

(57) ABSTRACT

The invention relates to a cable guide (1) for a cable connection between a vehicle body (52) and a sliding door (54) comprising a first connection device (4), a second connection device (2) and an energy chain (3) running between the first connection device (4) and the second connection device (2), which has a stretched configuration when the sliding door (54) is closed and a deflected configuration when the sliding door (54) is open, wherein the energy chain (3) has a first end link (42) at one end and a second end link (42) at the opposite end (22), wherein the first end link (42) is pivoted on the first connection device (4) and the second connection device (2) comprises a tensioning device (24) for the energy chain (3).

Figure 3A:
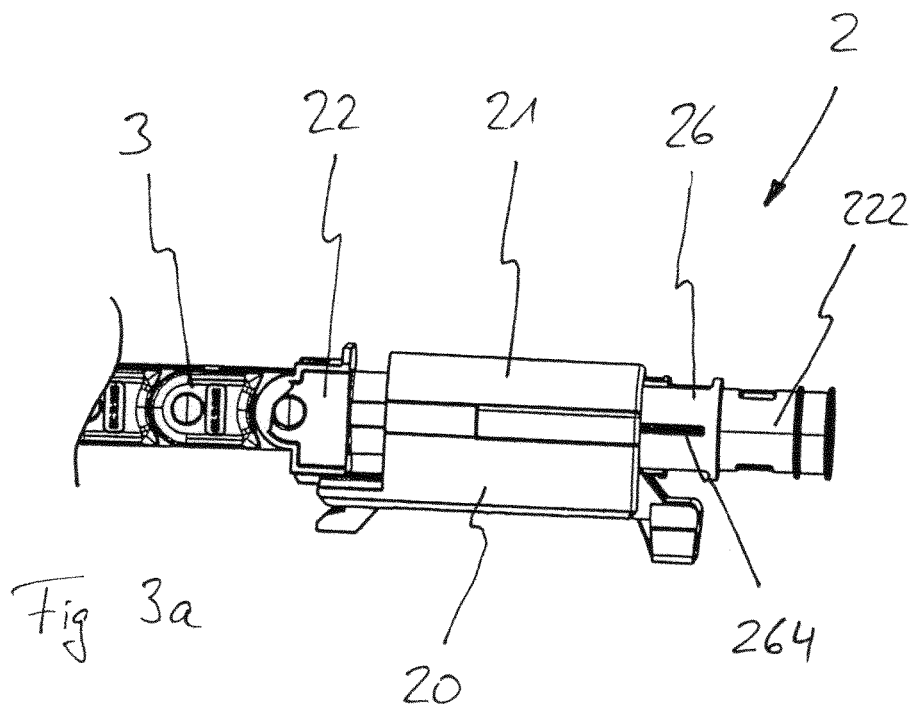

The cable guide (1) according to the invention is further characterized in that the second end link (22) of the energy chain (3) is mounted longitudinally movable on the second connection device (2) and is acted upon by the tensioning (Continued)

device (24) in such a way that, in stretched configuration of the energy chain (3), the second end link (22) is sustained in a floating equilibrium position movable in both directions. The invention also relates to a motor vehicle (5) with a vehicle body (52) and at least one sliding door (54), which comprises a cable guide (1) according to the invention.

10 Claims, 4 Drawing Sheets

(56) References Cited

U.S. PATENT DOCUMENTS

| | | | |
|---|---|---|---|
| 2009/0121093 A1 | 5/2009 | Murayama et al. | |
| 2009/0140107 A1 | 6/2009 | Murayama et al. | |
| 2016/0218496 A1* | 7/2016 | Terada | H02G 3/0462 |
| 2016/0264076 A1* | 9/2016 | Kogure | H02G 3/0616 |
| 2017/0297515 A1 | 10/2017 | Sekino et al. | |
| 2019/0077343 A1 | 3/2019 | Kogure et al. | |
| 2021/0016725 A1* | 1/2021 | Yamashita | E05F 15/655 |
| 2021/0053513 A1* | 2/2021 | Uno | H02G 11/00 |
| 2021/0288482 A1* | 9/2021 | Isoda | B60R 16/027 |
| 2022/0190568 A1* | 6/2022 | Yoshida | H02G 3/0475 |

FOREIGN PATENT DOCUMENTS

| | | |
|---|---|---|
| DE | 102017206410 A1 | 10/2017 |
| DE | 112017002492 T5 | 2/2019 |
| EP | 1936767 A1 | 6/2008 |
| EP | 1944198 A1 | 7/2008 |
| FR | 2893457 A1 | 5/2007 |

\* cited by examiner

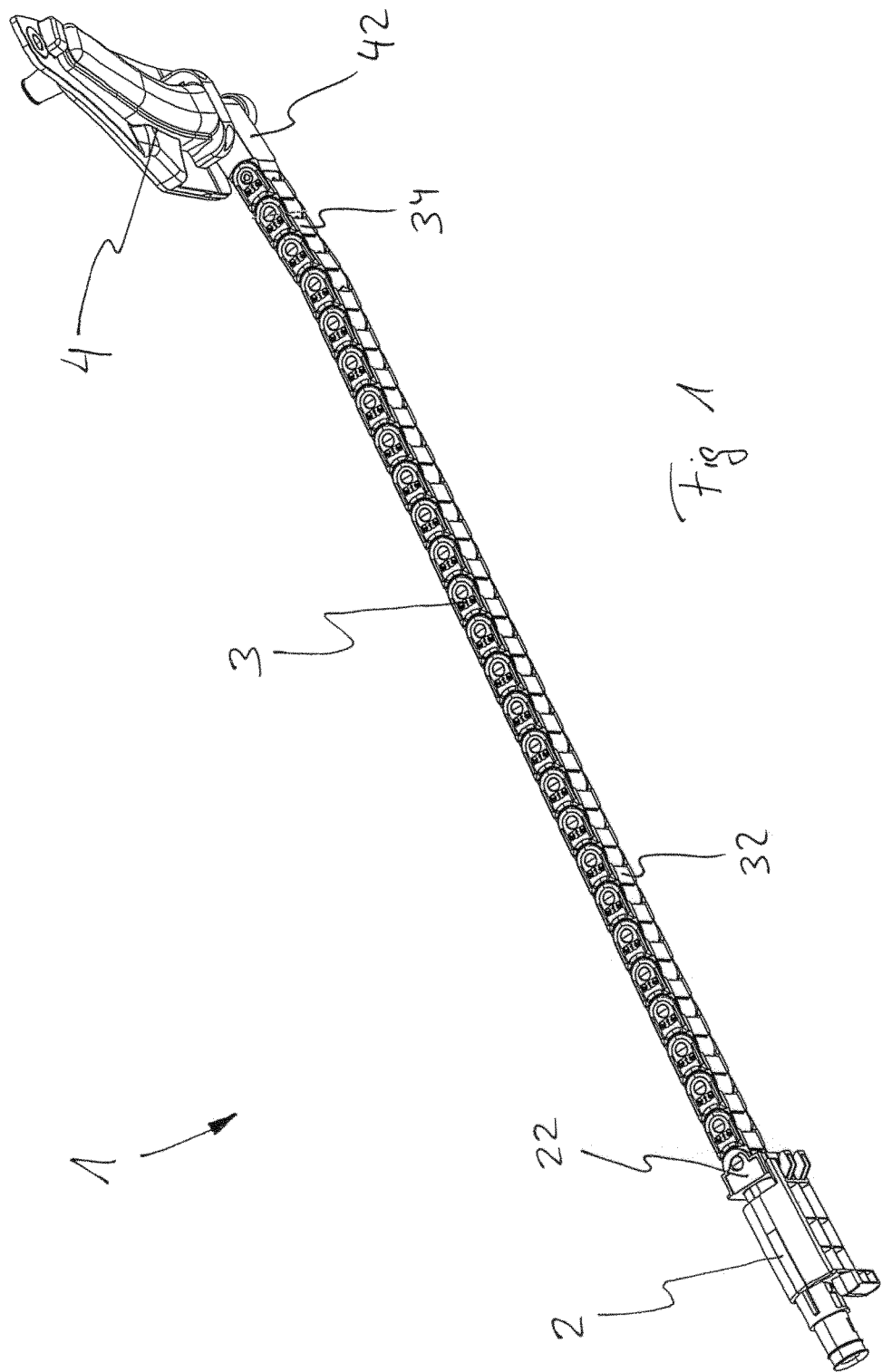

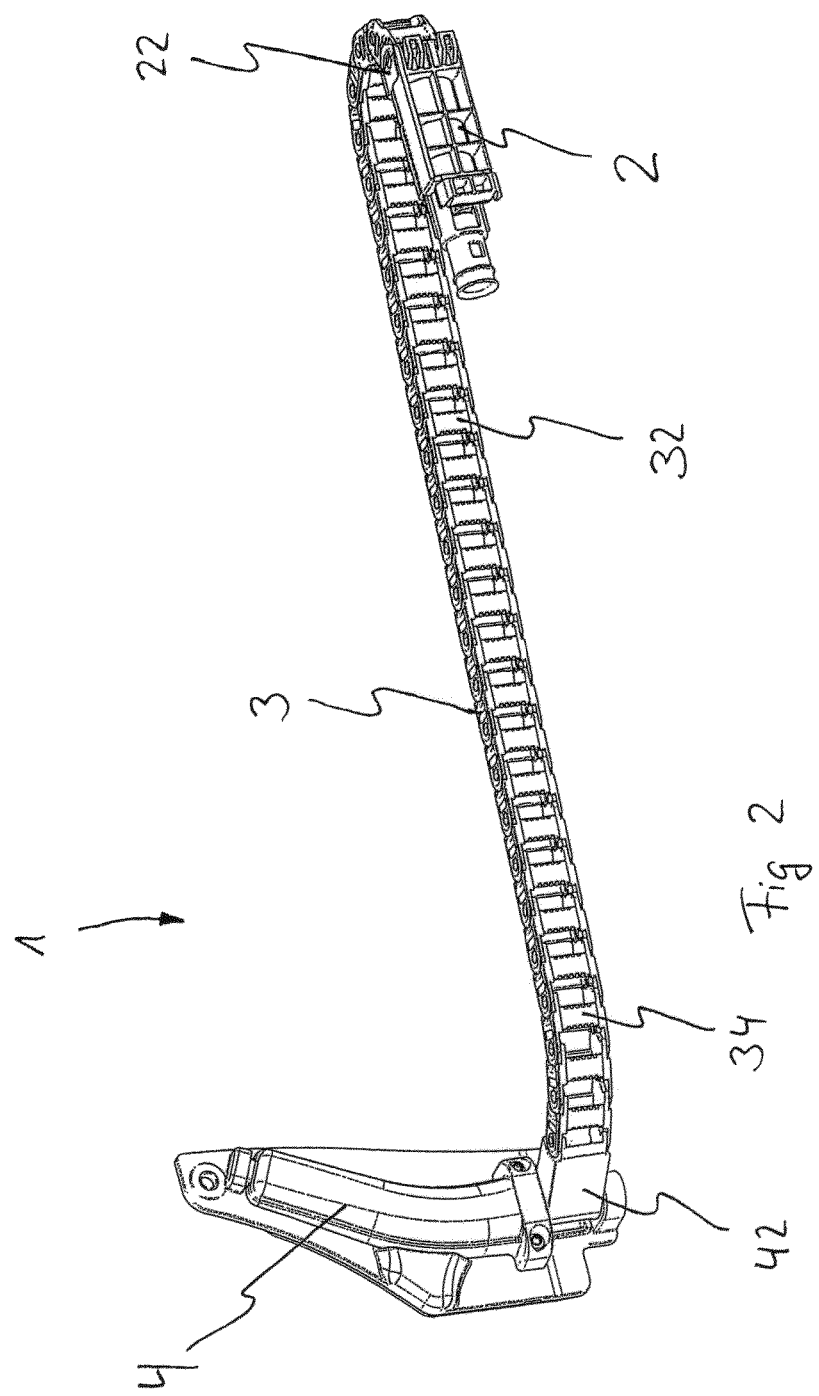

CABLE GUIDE AND MOTOR VEHICLE

The invention relates to a cable guide for a cable connection between a vehicle body and a sliding door, comprising a first connection device, a second connection device and an energy chain running between the first connection device and the second connection device, which has a stretched configuration when the sliding door is closed and a deflected configuration when the sliding door is open, wherein the energy chain has a first end link at one end and a second end link at the opposite end, wherein the first end link is pivoted on the first connection device and wherein the second connection device comprises a tensioning device for the energy chain.

The invention also relates to a motor vehicle with a vehicle body and at least one sliding door.

Conventional sliding doors of vehicles are, starting from the closed state, unlocked and consecutively restraint-guided during opening in such a way that the sliding door is first displaced transversely to the vehicle body and then slid along the vehicle body.

A generic cable guide for a permanent cable connection between a vehicle body and a sliding door is known, for example, from document DE 10 2005 055 848 A1. It is provided that a link chain is kept stretched by a tensioning force F1 when the sliding door is in the closed state, in order to ensure a defined initial situation. When the sliding door is slid open, the end chain link, which is pivoted on the door side, is actively pivoted by means of a spring force F2 in order to deflect the link chain. It has been shown that the opposing forces F1 and F2 must be carefully coordinated and regularly readjusted, otherwise the link chain tends to rattle, especially at the beginning of the opening process, when the sliding door and the vehicle body are still very close together, because it is either is not sufficiently tensioned or is pressed too close to the vehicle body at the door-sided end.

The object of the invention is to provide an alternative to known cable guides for a cable connection between a vehicle body and a sliding door, in which in particular contact with the vehicle body and/or the sliding door is effectively prevented and which is inexpensive to manufacture and easy to assemble.

The object is achieved according to the invention by a cable guide for a cable connection between a vehicle body and a sliding door, comprising a first connection device, a second connection device and an energy chain running between the first connection device and the second connection device, which has a stretched configuration when the sliding door is closed and a deflected configuration when the sliding door is open, wherein the energy chain has a first end link at one end and a second end link at the opposite end, wherein the first end link is pivoted on the first connection device and wherein the second connection device comprises a tensioning device for the energy chain, wherein the cable guide according to the invention is further characterized in that the second end link of the energy chain is mounted longitudinally movable on the second connection device and is acted upon by the tensioning device in such a way that, in stretched configuration of the energy chain, the second end link is sustained in a floating equilibrium position movable in both directions.

According to the invention, it is in particular provided that the second end link of the energy chain is mounted such that it can move in both directions along an axis of movement relative to the second connection device. When the energy chain is in a stretched configuration, the invention also provides for the second end link to be held in a floating equilibrium position by means of the tensioning device, with the chain link remaining able to move out of the equilibrium position in both directions along the axis of movement.

The mobility of the second end link relative to the second connection device can be limited by suitable measures, for example stops, in order to prevent the second end link from becoming detached from the second connection device. However, when designing the components of a cable guide according to the invention, it is particularly important to ensure that the position of equilibrium is sufficiently far away from the specified end points of mobility of the second end link of the energy chain.

During unlocking, the distance between the two connection devices of a cable guide of the generic type present between the vehicle body and the sliding door decreases. The floating equilibrium position provided according to the invention makes it possible to keep the energy chain under tension both when the sliding door is closed and when the sliding door is unlocked, until the opening sliding door has moved laterally away from the body. At the same time, thanks to the floating equilibrium position, any necessary tolerance compensation is always guaranteed. Thanks to the invention, the energy chain is only relaxed when there is sufficient space between the vehicle body and the sliding door to deflect the energy chain when the sliding door is pushed open. The longitudinally movable mounting of the second end link of the energy chain on the second connection device is also advantageous in that the energy chain does neither move in the direction of the vehicle body nor in the direction of the sliding door when tolerances are compensated and/or when the energy chain is tensioned. This effectively prevents the energy chain from hitting the vehicle body or the sliding door with accompanying rattling.

With the one tensioning device provided according to the invention at the second connection device, a simple and cost-effective construction with a clear direction and strength of the tensioning force and correspondingly reliable functioning of the tensioning device is made possible.

The floating equilibrium position of the stretched energy chain also offers simple and effective tolerance compensation for the length of the energy chain and the distance between the two connection devices, respectively.

The second connection device preferably comprises at least one stop for limiting a range of movement of the second end link when the configuration of the energy chain is deflected. This means in particular that regardless of the floating equilibrium position when the sliding door is closed, the second end link of the energy chain rests against the stop under the influence of the tensioning device when the sliding door is open.

For example, the first connection device is designed for fastening on the body and the second connection device for fastening on the door. This means in particular that the energy chain is pivoted to the body, while the energy chain in stretched configuration is aligned essentially longitudinally to the sliding door.

This enables that all deflected areas of the energy chain always remain between the open sliding door and the vehicle body, even if the sliding door is only partially pushed open. The energy chain is thus effectively protected against accidental damage when entering or leaving the vehicle.

The first end link of the energy chain is preferably pivoted pre-tensionless on the first connection device. The pre-tensioning of the energy chain in the stretched configuration is essentially determined by the tensioning device and can thus be pre-determined in a controlled manner. The forces acting on the energy chain can be reduced to a minimum, which reduces stress and wear in the moving chain links. In addition, lighter and/or cheaper materials such as plastics can be used for the energy chain instead of metal.

Advantageously, the first connection device includes stops for limiting a pivoting range of the first end link on both directions. A suitable design of these stops can ensure that the deflected and therefore not pre-tensioned energy chain does not strike the vehicle body and/or the sliding door. At the opposite end of the pivoting range, an over-dead center position or pivoting in the wrong direction of the first end link during pushing open the sliding door can be prevented by a suitable design of the relevant stop.

The chain links of an energy chain are usually connected to one another in such a way that the chain links can be pivoted relative to one another from a stretched configuration in only one specific direction of deflection and are limited in the pivoting range in such a way that there is a minimum bending radius. Contrary to the direction of deflection, however, the chain links are generally supported against one another in such a way that pivoting beyond the stretched configuration of the energy chain is blocked.

It has proven particularly advantageous if the energy chain of a cable guide according to the invention has a first section at the first connection device and a second section at the second connection device, wherein the two sections can be deflected out of the stretched configuration in opposite directions.

When installed as intended between the vehicle body and the sliding door, it is preferably provided that the direction of deflection of the first section is away from the vehicle body and the direction of deflection of the second section is away from the sliding door.

In the area of the connection devices, where the energy chain comes closest to the vehicle body or the sliding door this prevents the energy chain from being able to deflect towards the vehicle body or the sliding door, respectively. Even for small movements of the energy chain, for example due to vibrations or impacts, hitting and rattling can be prevented effectively.

In addition, it is possible to provide an angle deviating from 180° in the transition between the two sections, even when the energy chain is pre-tensioned in a stretched configuration, said angle forcing the energy chain to be correctly deflected when the sliding door is pushed open and the tensioning force is removed.

A sufficient distance between the deflected energy chain and the vehicle body can be ensured, for example, if the first section of the energy chain has a larger minimum bending radius than the second section. Alternatively or additionally, provision can be made for the first section of the energy chain to be shorter than the second section.

The tensioning device preferably comprises a compression-loaded spring. The compression-loaded spring is preferably suitably supported on the second connection device in order to exert a tensioning force for pre-tensioning the energy chain on the second end link. This enables a significantly simpler construction and assembly of the tensioning device and/or the second connection device and/or the second end link of the energy chain compared to the use of a tensile-loaded spring.

Unintentional torsion of the energy chain is effectively prevented if the second end link of the energy chain is mounted on and secured against rotation with respect to the second connection device.

The object of the invention is also achieved by a motor vehicle with a vehicle body and at least one sliding door, which is further characterized in that the motor vehicle comprises a cable guide according to the invention.

If the motor vehicle according to the invention comprises a plurality of sliding doors, a cable guide according to the invention is provided for at least one of the plurality of sliding doors.

The first connection device of the cable guide is preferably attached to the vehicle body, while the second connection device of the cable guide is attached to the sliding door.

Figure 3B:
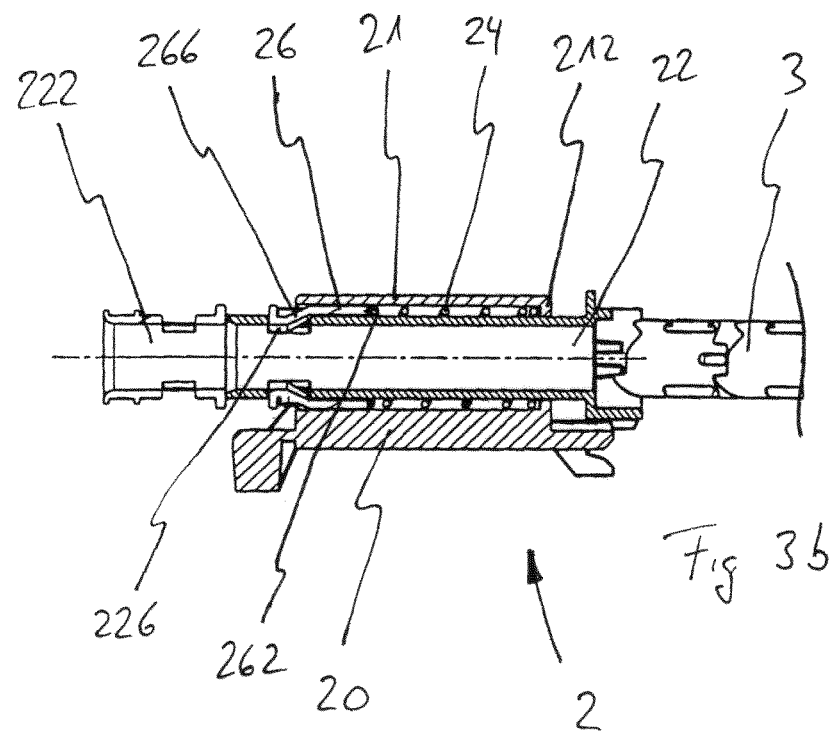
Figure 4:
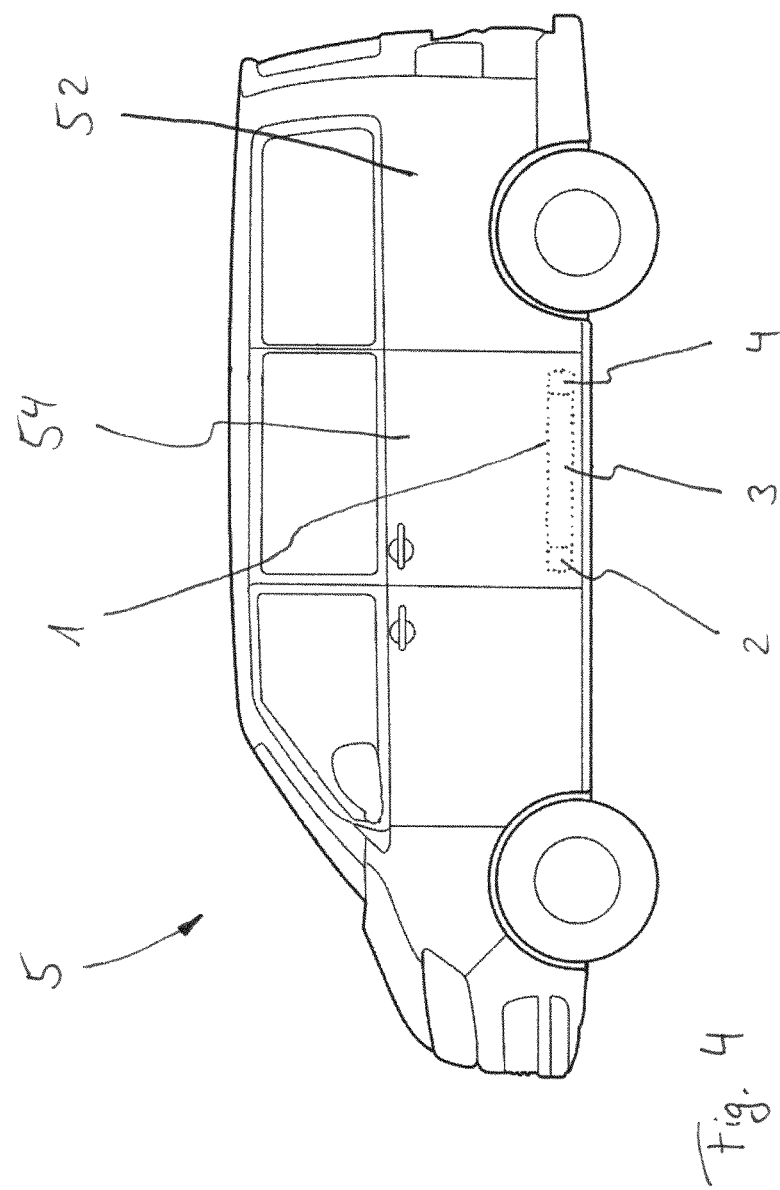

In the following, the invention is explained in more detail using an exemplary embodiment of the invention, which is illustrated in the drawings. It is shown in FIG. 1 schematically an exemplary cable routing according to the invention with the sliding door closed;

FIG. 2 schematically an exemplary cable routing according to the invention with the sliding door closed;

FIG. 3*a* a schematic detailed view of the door-sided connection device of the cable guide according to the invention from FIGS. 1 and 2;

FIG. 3*b* a schematic sectional view of the door-sided connection device from FIG. 3*a*; and FIG. 4 schematically an exemplary motor vehicle according to the invention with a cable guide according to the invention.

The drawings show in FIGS. 1 and 2 schematically an exemplary cable guide 1 according to the invention. Details of the exemplary cable guide according to the invention are shown in FIGS. 3*a* and 3*b*. The cable guide 1 is set up and designed in particular to securely guide a cable or cable harness between a vehicle body 52 with a door opening on the one hand and a sliding door 54 for closing the door opening on the other. The routed cables are not part of the invention and are therefore not shown in the drawings.

The cable guide 1 according to the invention comprises a door-sided connection device 2 which can be firmly connected to the sliding door 54. Furthermore, the cable guide 1 includes a body-sided connection device 4 which can be firmly connected to the vehicle body 52. Finally, the cable guide 1 comprises an energy chain 3, which has a first end link 42 at one end, which is pivoted on the body-sided connection device 4, and a second end link 22 at its opposite end, which is mounted longitudinally movable on the door-sided connection device 2.

Furthermore, the energy chain 3 comprises two sections 32, 34 with different, in particular opposite, directions of deflection and different minimum bending radii. The door-sided section 32 allows a deflection towards the vehicle body 52 with a comparatively smaller minimum bending radius, but not towards the sliding door 54, while the body-sided section 34 allows a deflection towards the sliding door 54 with a comparatively larger minimum bending radius, but not towards the vehicle body 52. In addition, the body-sided section 34 is significantly shorter than the door-sided section 32.

Details on the door-sided connection device 22 can be seen in FIGS. 3*a* and 3*b*, with FIG. 3*a* showing a side view and FIG. 3*b* showing a sectional view from the side.

The door-sided connection device 2 comprises a base body 20 which can be firmly connected to a sliding door 54. The base body 20 has a bracket 21, within which the second end link 22 of the energy chain 3 is located. For this purpose, the end link 22 has an essentially hollow-cylindrical section that is pushed into the bracket 21.

A compression spring 24 is arranged concentrically around the hollow-cylindrical section and is rests against a stop 212 on the bracket 21. On the opposite side, the compression spring 21 is secured with a sleeve 26, which is arranged at least partially concentrically between the hollow-cylindrical section of the end link 22 and the bracket 21 and by means of latching hooks 266, which engage in suitable recesses 226 on the end link 22 and are therefore secured against rotation with respect to the end link 22. On its outer circumference, the sleeve 26 has a ridge 264 aligned to its longitudinal axis, which runs in a matching groove on the inside of the bracket 21, so that the sleeve 26 can move longitudinally together with the end link 22, but is secured against rotation within the bracket 21 or the door-sided connection device 2, respectively.

The longitudinal movement of the end link 22 within the connection device 2 is limited on both sides by the stop 212, namely when the spring 24 is fully compressed on the one hand and when the thickened section on the chain side rests against the section adjoining the hollow-cylindrical section on the other.

To connect, for example, a strain relief or other cable-guiding elements within the sliding door, an end piece 222 is also provided on the end of the end link 22 facing away from the chain, which is permanently or detachably connected to the hollow-cylindrical section of the end link 22, for example by latches, a screw connection, gluing or friction welding.

FIG. 1 shows the cable guide 1 according to the invention in a stretched configuration, which corresponds to the closed sliding door 54 when used as intended. The dimensions of the cable guide 1, in particular the length of the energy chain 3, are selected in such a way that the end link 22 is pre-tensioned by the spring 24 within the door-sided connection device 2 and can be moved longitudinally in both directions. It is a particular advantage of the invention that the longitudinally movable mounting of the second end link 22 for tensioning the energy chain 3 means that there is no transverse movement in the direction of the sliding door 54 or the vehicle body 52. Especially at the beginning of the opening or at the end of the closing of the sliding door 54, where the gap between the sliding door 54 and the vehicle body 52 is particularly narrow, this effectively prevents the stretched energy chain 3 from hitting or rattling.

In contrast to this, FIG. 2 shows the same cable guide 1 according to the invention in a deflected configuration, which corresponds to the open sliding door 54 when used as intended.

An exemplary motor vehicle 5 according to the invention is shown in FIG. 4. The motor vehicle 5 includes a vehicle body 52 with an opening that can be closed by a sliding door 54. The motor vehicle 5 according to the invention is characterized in that a cable guide 1 according to the invention is arranged between the vehicle body 52 and the sliding door 54. The door-sided connection device 2 of the cable guide 1 is connected to the sliding door 54 and the body-sided connection device 4 of the cable guide 1 is connected to the vehicle body 52.

The illustration in FIG. 4 shows the motor vehicle 5 according to the invention with the sliding door 54 closed. The opening in the vehicle body 52 is closed by means of the sliding door 54 and the cable guide 1 is located on the side of the sliding door 54 facing the vehicle interior and is covered by it. The energy chain 3 of the cable guide 1 between the door-sided connection device 2 and the body-sided connection device 4 is in a stretched configuration.

REFERENCES 1 cable guide
2 door-sided connection device
20 base body
21 bracket
212 stop
22 door-sided end link
222 end piece
226 recess
24 spring
26 sleeve
262 abutting surface
264 ridge
266 latching hook
3 energy chain
32 first section
34 second section
4 body-sided connection device
40 base body
42 body-sided end link
5 vehicle
52 vehicle body
54 sliding door

The invention claimed is:

1. A cable guide for a cable connection between a vehicle body and a sliding door comprising:
   a first connection device;
   a second connection device; and
   an energy chain running between the first connection device and the second connection device, said energy chain having a stretched configuration when the sliding door is closed and a deflected configuration when the sliding door is open;
   wherein the energy chain has a first end link at one end and a second end link at the opposite end,
   wherein the first end link is pivoted on the first connection device and the second connection device comprises a tensioning device for the energy chain,
   wherein the second end link of the energy chain is mounted longitudinally movable on the second connection device and is acted upon by the tensioning device such that in the stretched configuration of the energy chain the second end link is sustained in a floating equilibrium position movable in both directions.

2. The cable guide according to claim 1, wherein the first connection device is configured for fastening on the body and the second connection device is configured for fastening on the door.

3. The cable guide according to claim 1, wherein the first end link of the energy chain is pivoted pre-tensionless on the first connection device.

4. The cable guide according to claim 1, wherein the energy chain has a first section at the first connection device and a second section at the second connection device, and wherein the first section and the second section are deflectable out of the stretched configuration in opposite directions.

5. The cable guide according to claim 4, wherein the first section of the energy chain has a larger minimum bending radius than the second section.

6. The cable guide according to claim 4, wherein the first section of the energy chain is shorter than the second section.

7. The cable guide according to claim 1, wherein the tensioning device comprises a compression-loaded spring.

8. The cable guide according to claim 1, wherein the second end link of the energy chain is mounted on and secured against rotation with respect to the second connection device.

9. A motor vehicle comprising a vehicle body, at least one sliding door, and a cable guide according to claim 1.

10. The motor vehicle according to claim 9, wherein the first connection device of the cable guide is attached to the vehicle body and the second connection device of the cable guide is attached to the sliding door.

* * * * *